(12) United States Patent
Anwar

(10) Patent No.: US 10,228,011 B1
(45) Date of Patent: Mar. 12, 2019

(54) LOCKOUT DEVICE

(71) Applicant: Brady Worldwide, Inc., Milwaukee, WI (US)

(72) Inventor: Sohail Anwar, New Berlin, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 0 days.

(21) Appl. No.: 15/599,012

(22) Filed: May 18, 2017

(51) Int. Cl.
*F16B 41/00* (2006.01)
*F16L 23/00* (2006.01)

(52) U.S. Cl.
CPC .......... *F16B 41/005* (2013.01); *F16L 23/003* (2013.01)

(58) Field of Classification Search
CPC .. Y10T 70/5867; F16B 41/005; F16B 41/002; F16B 41/007; F16L 23/003; F16L 23/006
USPC ... 70/175–180, 229–232, DIG. 57, 158–173, 70/225, 226, 259, 260; 403/11, 315–317; 411/120, 910; 81/13; 285/80–82, 87, 285/364, 405, 406; 137/377, 383–385; 251/89, 90, 95
See application file for complete search history.

(56) References Cited

U.S. PATENT DOCUMENTS

| | | | | | |
|---|---|---|---|---|---|
| 1,473,751 | A | * | 11/1923 | Walker | G01F 15/185 285/30 |
| 1,517,224 | A | * | 11/1924 | Walsh | F16K 17/205 251/103 |
| 1,747,204 | A | * | 2/1930 | White | B60K 15/0409 70/164 |
| 1,919,701 | A | * | 7/1933 | Morreale | G01F 15/007 285/80 |
| 2,403,718 | A | * | 7/1946 | Hauck | B25B 13/48 81/13 |
| 2,544,022 | A | * | 3/1951 | Johnson | B25B 23/0085 81/13 |
| 2,600,214 | A | * | 6/1952 | Davis | B25B 13/06 81/13 |
| 3,349,650 | A | * | 10/1967 | Wright | B25B 13/481 81/13 |
| 3,410,122 | A | * | 11/1968 | Moses | 248/553 |
| 4,571,966 | A | * | 2/1986 | Lopez, Jr. | B25B 13/50 70/232 |
| 5,469,724 | A | * | 11/1995 | Pollard | E03B 9/06 137/296 |

(Continued)

OTHER PUBLICATIONS

Master Lock Company LLC, Blind Flange Lockout Device, product brochure, dated Sep. 2015, 2 pages.

*Primary Examiner* — Lloyd A Gall
(74) *Attorney, Agent, or Firm* — Quarles & Brady LLP

(57) ABSTRACT

A lockout device configured to prevent access to a pipe flange connection comprises a bar, a pair of opposed cup sections, and an engagement mechanism. The pair of opposed cup sections may each include a main cup segment coupled to the bar and a hinged cup segment hingedly coupled to the main cup segment. One or more of the main cup segments can be slidably coupled to the bar and the engagement mechanism can be configured to selectively prevent the main cup segments(s) that is/are slidably coupled to the bar from sliding relative to the bar. This engagement mechanism or latch can be hinged on a side of the bar opposite a side of the bar on which the engagement mechanism includes openings for receiving one or more locks.

22 Claims, 13 Drawing Sheets

(56) References Cited

U.S. PATENT DOCUMENTS

| | | | | |
|---|---|---|---|---|
| 5,588,316 | A | * | 12/1996 | Jones ........................ F16K 35/10 137/382 |
| 5,701,771 | A | * | 12/1997 | Bailey ................... B60R 25/022 70/163 |
| 5,836,184 | A | | 11/1998 | Brown |
| 6,068,020 | A | * | 5/2000 | Sammons ............... F16K 35/06 137/377 |
| 6,588,303 | B1 | * | 7/2003 | Walsh ................. B25B 23/0085 81/125.1 |
| 6,644,075 | B2 | | 11/2003 | Thompson |
| 6,829,993 | B2 | * | 12/2004 | Aronson ................ B41K 1/003 101/333 |
| 7,018,253 | B2 | * | 3/2006 | Li ......................... B63H 20/02 440/55 |
| 7,111,554 | B2 | * | 9/2006 | Aronson ................ B41K 1/003 101/333 |
| D767,368 | S | | 9/2016 | Sanford |
| 2015/0233099 | A1 | * | 8/2015 | Holmes .................. F16K 35/14 251/90 |

\* cited by examiner

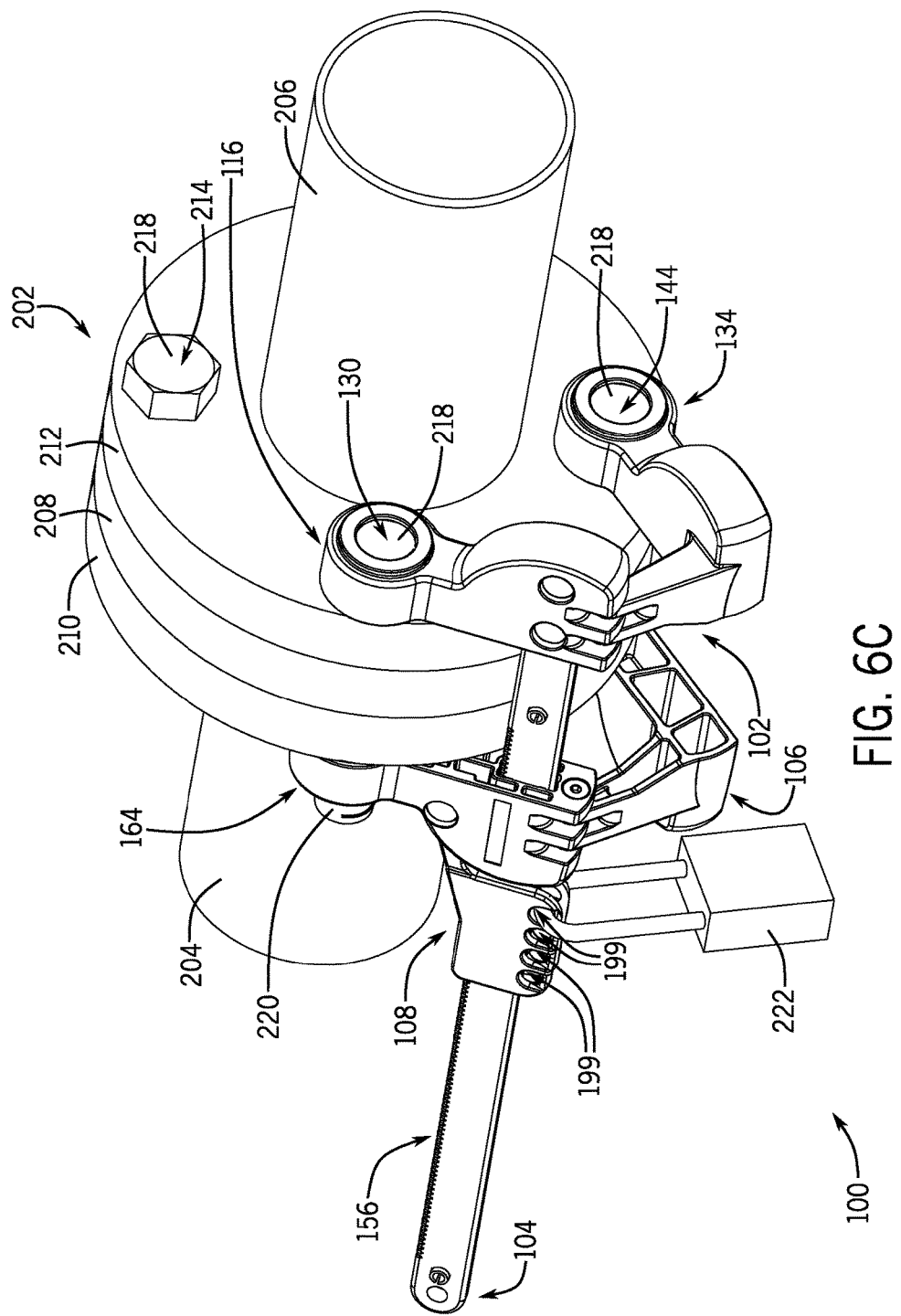

LOCKOUT DEVICE

STATEMENT OF FEDERALLY SPONSORED RESEARCH OR DEVELOPMENT

Not applicable.

CROSS-REFERENCE TO RELATED APPLICATION

Not applicable.

BACKGROUND

This disclosure relates to a lockout device for locking out a pipe flange connection during a lockout procedure.

Machines, equipment, and other systems often contain energy sources that can be potentially hazardous to workers if these energy sources are not properly controlled and maintained. These energy sources may be, as some non-limiting examples, electrical, mechanical, hydraulic, pneumatic, chemical, and/or thermal in nature.

In order to protect workers from these energy sources while using or maintaining the machines or equipment, proper lockout/tagout procedures and practices may be voluntarily adopted or may be required by the Occupational Safety and Health Administration (OSHA). What constitutes appropriate lockout/tagout practices and procedures will largely depend on the specific equipment. Lockout/tagout procedures and practices involve following pre-determined steps or operations in order to disable the machinery or equipment to prevent the release of potentially hazardous energy before the equipment is maintained or to ensure that, when the equipment is placed back into service, workers remain protected from the potentially hazardous energy.

As one example of a lockout procedure, a pipe flange connection may have a blind flange inserted therein to prevent fluid flow therethrough before a maintenance procedure is done on a fluid system downstream of the connection. This pipe flange connection can be locked out using a lockout device during the maintenance to ensure that no individual mistakenly removes the blind flange and resumes fluid flow while the maintenance procedure is being done. After the maintenance is completed, the lockout device can be removed from the pipe flange connection. The blind flange can then be removed from the pipe flange connection and fluid flow can resume.

SUMMARY

Disclosed herein are improved lockout devices configured to prevent access to a pipe flange connection. Such lockout devices may clamp around the fasteners of the flanged connection (e.g., nuts and bolts) and be locked to prevent the pipe connection from being disassembled and the blind flange from being removed. Although the lockout device may have use in preventing the removal of a blind flange, it is not so limited and could be employed in any use case where securing a bolted connection as in, for example, a flanged arrangement might be desired.

According to one aspect of the invention, a lockout device configured to prevent access to a pipe flange connection is provided. The lockout device comprises a bar, a fixed section, a sliding section, and an engagement mechanism. The fixed section includes a fixed cup segment rigidly coupled to the bar and a hinged cup segment hingedly coupled to the fixed cup segment. The sliding section includes a sliding cup segment slidably coupled to the bar and a sliding hinged cup segment hingedly coupled to the sliding cup segment. The engagement mechanism is coupled to the sliding section and is configured to selectively engage the bar, thereby selectively preventing the sliding section from sliding relative to the bar. The fixed cup segment and the hinged cup segment respectively oppose the sliding cup segment and the sliding hinged cup segment.

In some forms, the fixed section and the sliding section may be configured to collectively cover at least one head of a bolt and at least one corresponding nut of the pipe flange connection, thereby preventing access to the at least one head of the bolt and the at least one corresponding nut of the pipe flange connection (although in some configurations it may be possible that there be two exposed bolts as in a double threaded rod and both of the nuts may be covered). Each of the fixed cup segment, the hinged cup segment, the sliding cup segment, and the sliding hinged cup segment may include a cup. Each cup of the fixed section may be configured to cover a corresponding one of the at least one head of the bolt and the at least one corresponding nut and each corresponding cup of the sliding section may be configured to cover a corresponding different one of the at least one head of the bolt and the at least one corresponding nut. Each cup may additionally include a through-hole configured to allow a threaded portion of the bolt to pass through the through-hole, while the corresponding nut is covered by the corresponding cup.

In some forms, the engagement mechanism may include at least one lockout aperture configured to receive a lock and, when the lock is received within the at least one lockout aperture, the engagement mechanism may be locked in engagement with the bar. This lock can prevent the fixed cups from being separated from the sliding cups.

In some forms, the engagement mechanism may be a latch that is hingedly coupled to the sliding cup segment. The bar may include teeth on an edge, the latch may include internal teeth configured to engage the teeth of the bar, and the latch may be selectively rotatable to engage and disengage the internal teeth of the latch with the teeth of the bar.

In some forms, each of the fixed cup segment and the sliding cup segment may include a connection arm extending between the bar and the corresponding cup.

In some forms, the hinged cup segment may include a connection arm hingedly coupled to the fixed cup segment. The connection arm may include an extension portion and a connection portion. The extension portion may extend between the fixed cup segment and the connection portion. The connection portion may extend between the extension portion and the corresponding cup. The sliding hinged cup segment may include a sliding connection arm hingedly coupled to the sliding cup segment. The sliding connection arm may include a sliding extension portion and a sliding connection portion. The sliding extension portion may extend between the sliding cup segment and the sliding connection portion. The sliding connection portion may extend between the sliding extension portion and the corresponding cup.

In some forms, the bar may include at least one obstruction element configured to prevent the sliding cup segment from sliding past the at least one obstruction element of the bar. The obstruction element(s) may be a spring pin secured in the bar.

According to another aspect of the invention, a lockout device configured to prevent access to a pipe flange connection is provided. The lockout device comprises a bar, a pair of opposed cup sections, and an engagement mechanism. The pair of opposed cup sections each include a main cup segment coupled to the bar and a hinged cup segment hingedly coupled to the main cup segment. At least one of the main cup segments is slidably coupled to the bar and the engagement mechanism is configured to selectively prevent the at least one of the main cup segments that is slidably coupled to the bar from sliding relative to the bar.

In some forms, the pair of opposed cup sections may be configured to collectively cover at least one head of a bolt and at least one corresponding nut of the pipe flange connection, thereby preventing access to the at least one head of the bolt and the at least one corresponding nut of the pipe flange connection. Each of the main cup segments and the hinged cup segments of the pair of opposed cup sections may include a cup. Each cup of one of the pair of opposed cup sections may be configured to cover a corresponding one of the at least one head of the bolt and the at least one corresponding nut, and each cup of the other of the pair of opposed cup sections may be configured to cover a corresponding different one of the at least one head of the bolt and the at least one corresponding nut. Each cup may additionally include a through-hole configured to allow a threaded portion of the bolt to pass through the through-hole, while the corresponding nut is covered by the corresponding cup.

In some forms, the engagement mechanism may include at least one lockout aperture configured to receive a lock. When the lock is received within the at least one lockout aperture, the engagement mechanism may be locked in engagement with the bar.

In some forms, the bar may include teeth on an edge. The engagement mechanism may be a latch that includes internal teeth configured to engage the teeth of the bar and is hingedly coupled to the at least one of the main cup segments that is slidably coupled to the bar. The latch may be selectively rotatable to engage and disengage the internal teeth of the latch with the teeth of the bar and in some forms lockable in the engaged position.

In some forms, the bar may include at least one obstruction element configured to prevent the at least one of the main cup segments that is slidably coupled to the bar from sliding past the at least one obstruction element of the bar.

According to another aspect, a lockout device configured to prevent access to a pipe flange connection is disclosed in which the lockout device has a bar including teeth on an edge, a pair of opposed cup sections coupled to the bar, and a latch including internal teeth configured to engage the teeth of the bar. At least one of the pair of opposed cup sections is slidably coupled to the bar. The latch is hingedly coupled to the one of the pair of opposed cup sections that is slidably coupled to the bar and is selectively rotatable to engage and disengage the internal teeth of the latch with the teeth of the bar.

In some forms, the pair of opposed cup sections each may include a main cup segment coupled to the bar and a hinged cup segment hingedly coupled to the main cup segment.

In some forms, the latch may include at least one lockout aperture configured to receive a lock and, when the lock is received within the at least one lockout aperture, the latch is locked into engagement with internal teeth of the bar (thereby preventing disengagement of the latch with the bar while the lock or locks are in place). In order to prevent rotation, the lockout aperture(s) may be on a side of the bar opposite a side of the bar on which an axis of hinged rotation of the latch is disposed such that the latch cannot be rotatably disengaged from the bar while the lock or locks is/are in place.

These and still other advantages of the invention will be apparent from the detailed description and drawings. What follows is merely a description of some preferred embodiments of the present invention. To assess the full scope of the invention the claims should be looked to as these preferred embodiments are not intended to be the only embodiments within the scope of the claims.

BRIEF DESCRIPTION OF THE DRAWINGS

FIGS. 6A-6C are a front, top, left perspective view of a lockout device similar to that of FIG. 1, but in which the cups are differently sized, shown partially installed on a pipe flange connection, shown fully installed on a pipe flange connection, and shown fully installed on and locked onto a pipe flange connection, respectively.

DETAILED DESCRIPTION

Figure 1:
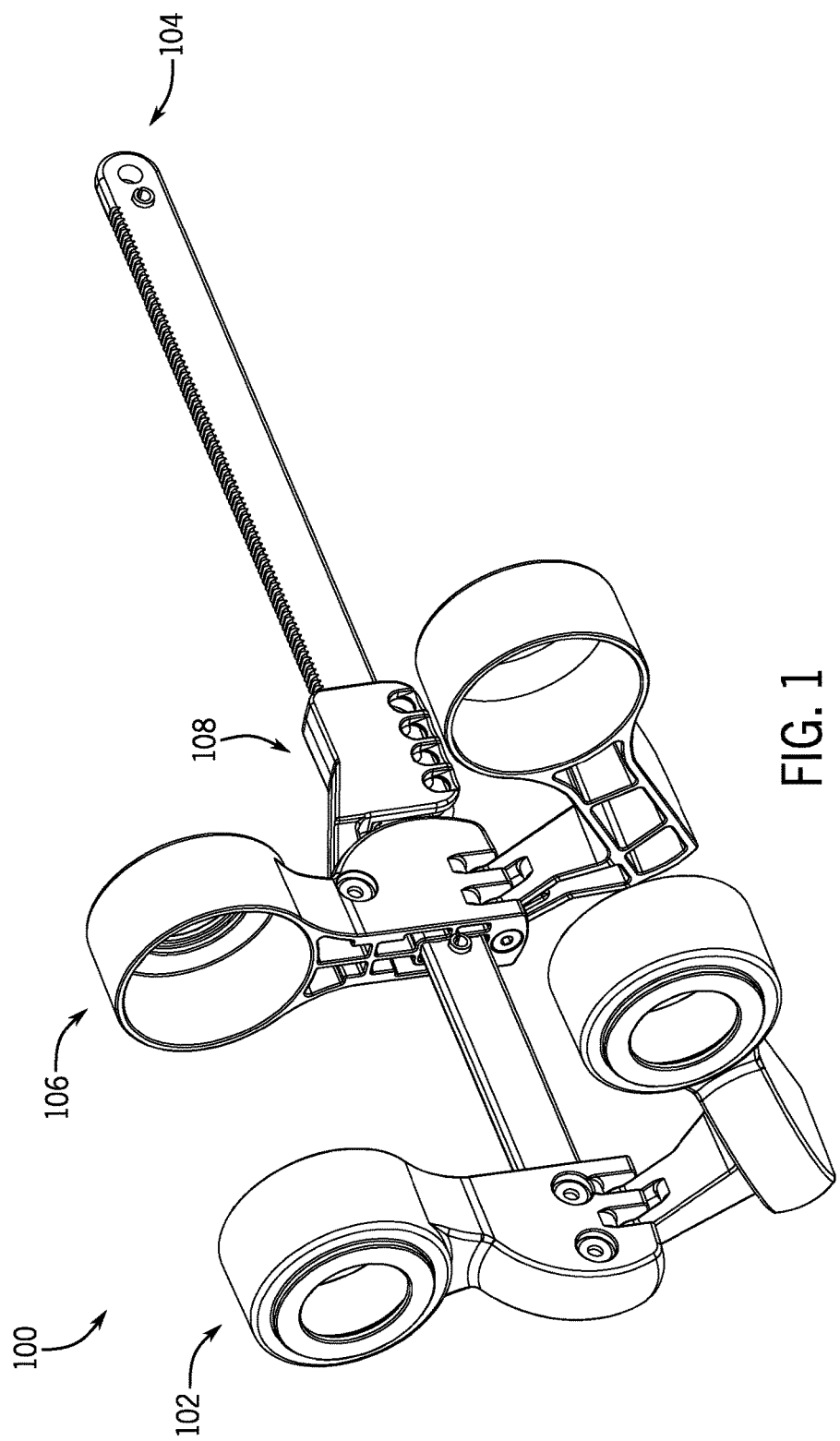
FIG. 1 is a front, top, right perspective view of a lockout device.

Referring first to FIG. 1, a lockout device 100 is illustrated. The lockout device 100 can be used to prevent access to a pipe flange connection, typically during a lockout procedure, such as when a blind flange is inserted into the pipe flange connection to prevent flow through the pipe flange connection while routine maintenance is being done downstream of the pipe flange connection. However, the use of the lockout device 100 is not solely restricted to that use case. At a high level, the lockout device 100 includes a fixed section 102, a bar 104 to which the fixed section 102 is fixed, a sliding section 106 selectively translatably slidable along an axial length of the bar 104 to position the sliding section 106 relative to the fixed section 102, and an engagement mechanism 108 to selectively secure the position of the sliding section 106 on the bar 104.

Figure 2A:
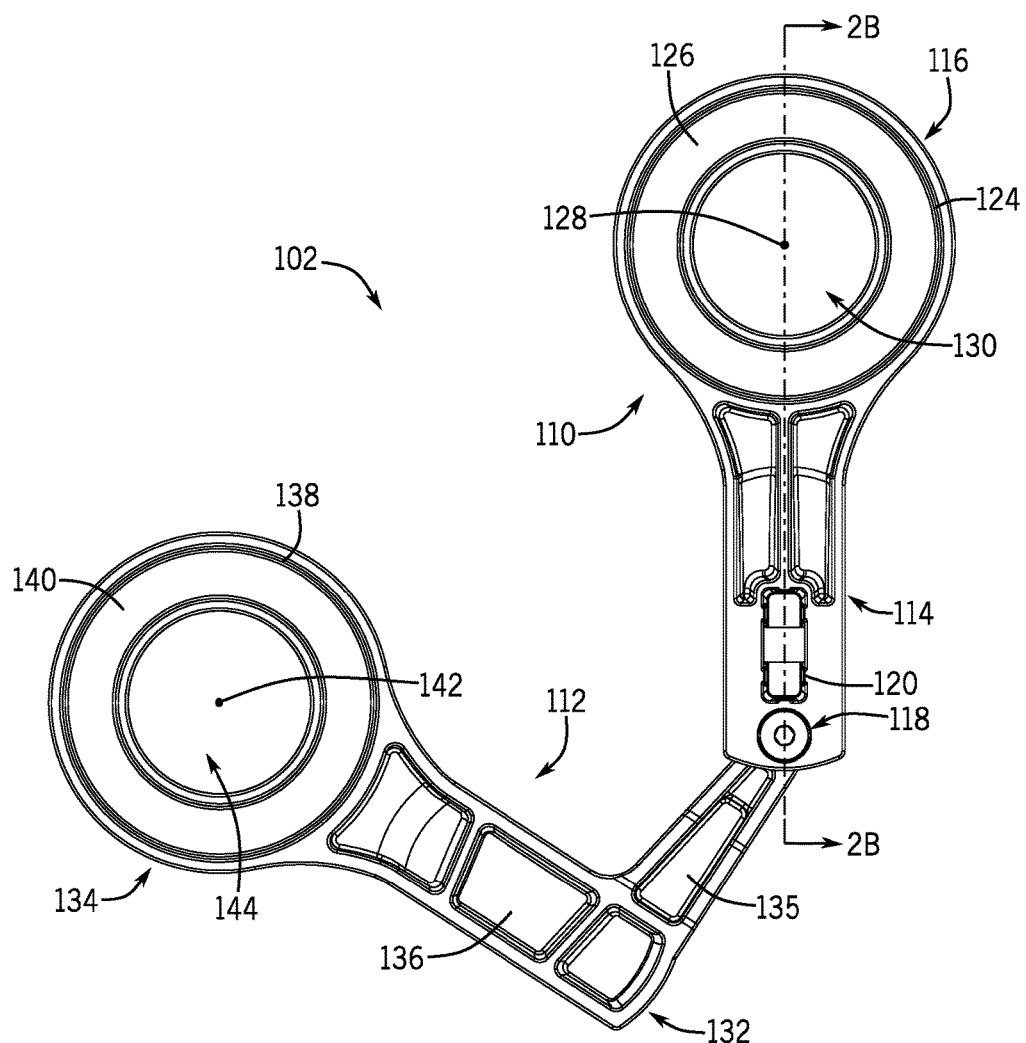
FIG. 2A is a rear elevational view of a fixed section of the lockout device of FIG. 1.
Figure 2B:
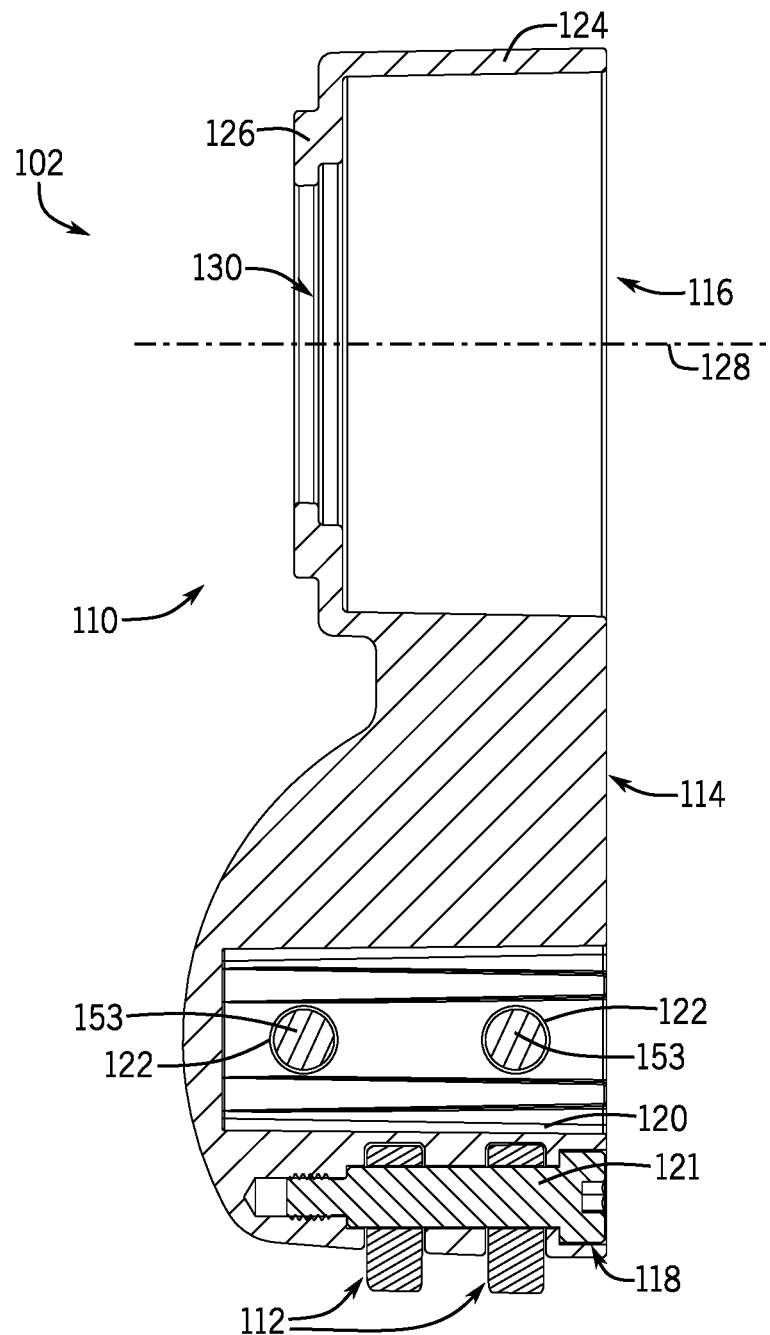
FIG. 2B is a cross-sectional view of a fixed cup segment of the fixed section taken along line 2B-2B of FIG. 2A.

Turning now to FIGS. 2A and 2B, the fixed section 102 is illustrated in greater detail. The fixed section 102 includes a fixed cup segment 110 and a hinged cup segment 112 which is hingedly coupled to the fixed cup segment 110.

The fixed cup segment 110 includes a fixed connection arm 114 and a fixed cup 116. The fixed connection arm 114 is rigidly fixed to the bar 104 and includes a hinge 118 and a bar-engagement recess 120. The hinge 118 is disposed at a bottom end of the fixed connection arm 114 beneath the bar-engagement recess 120 and includes a shoulder screw 121. The bar-engagement recess 120 is also disposed near the bottom end of the fixed connection arm 114, proximate the hinge 118, and includes a plurality of bar-engagement apertures 122 (shown in FIG. 2B) which extend perpendicularly to the longitudinal axis of the bar 104.

The fixed cup 116 is coupled to a top end of the fixed connection arm 114 and includes a circumferential outer wall 124 and a fixed-cup front wall 126. The circumferential outer wall 124 defines a generally circular profile. The fixed-cup front wall 126 is coupled to a front edge of the circumferential outer wall 124 and extends radially inward toward a fixed-cup axis 128, terminating at a fixed-cup through-hole 130. The fixed-cup through-hole 130 is centered along the fixed-cup axis 128.

The hinged cup segment 112 includes a hinged connection arm 132 and a hinged cup 134. In the form illustrated, the hinged connection arm 132 includes a hinged extension portion 135 and a hinged connection portion 136. The hinged extension portion 135 is hingedly coupled at the hinge 118 of the fixed cup segment 110. The hinged extension portion 135 additionally extends in a radial direction between the hinge 118 and the hinged connection portion 136. The hinged connection portion 136 is coupled to the hinged extension portion 135 and extends in a non-radial direction (i.e., non-radial relative to the radial direction of extension of the hinged extension portion 135) between the hinged extension portion 135 and the hinged cup 134.

Similar to the fixed cup 116, the hinged cup 134 includes a circumferential outer wall 138 and a hinged-cup front wall 140. The circumferential outer wall 138 similarly defines a generally circular profile. The hinged-cup front wall 140 extends radially inward toward a hinged-cup axis 142, terminating at a hinged-cup through-hole 144. The hinged-cup through-hole 144 is centered at the hinged-cup axis 142.

Figure 3:
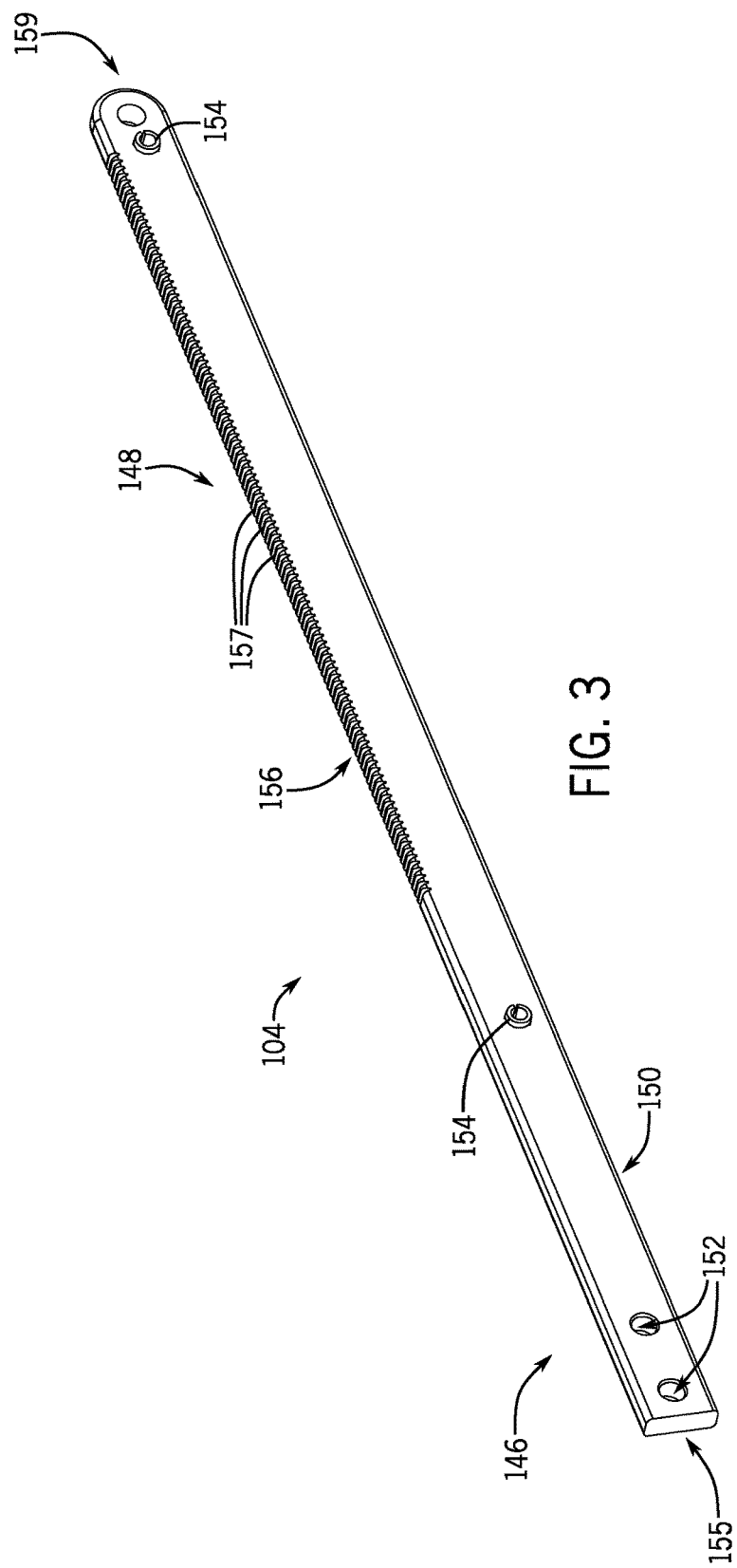
FIG. 3 is a front, top, right perspective view of a bar without the fixed and movable cup portions of the lockout device of FIG. 1.

Turning now to FIG. 3, the bar 104 is illustrated apart from the other portions of the device 100. The bar 104 includes a fixed-section engagement portion 146 and a sliding-section engagement portion 148 with an extension portion 150 therebetween.

The fixed-section engagement portion 146 is disposed proximate a front end 155 of the bar 104 and includes a plurality of engagement apertures 152. As shown in FIG. 1, as assembled, the fixed-section engagement portion 146 is rigidly fixed within the bar-engagement recess 120 of the fixed cup segment 110 using fasteners 153, such as rivets, to couple the bar-engagement apertures 122 of the fixed cup segment 110 with the engagement apertures 152 of the bar 104. In the illustrated embodiment, each of the bar 104 and the fixed cup segment 110 includes two corresponding apertures 122, 152 which align with one another. In other embodiments, each of the bar 104 and the fixed cup segment 110 can include one or more apertures, as desired. Alternatively, other forms of fixation might be employed to fix the bar 104 to the fixed section 102.

Referring again to FIG. 3, the sliding-section engagement portion 148 extends from proximate a rear end 159 of the bar 104 toward the front end 155 of the bar 104 and includes obstruction elements 154 and a toothed edge 156 having teeth 157. The obstruction elements 154 are disposed on opposing ends of the sliding-section engagement portion 148 and are configured to prevent the sliding section 106 from sliding, along the bar 104, past the obstruction elements 154.

In the illustrated embodiment, the obstruction elements 154 comprise spring pins inserted through the bar 104 in openings perpendicular to the longitudinal axis of the bar 104. In other embodiments, the obstruction elements 154 can comprise pins, protruding features of the bar, nut and bolt assemblies, or any other suitable features.

Figure 4A:
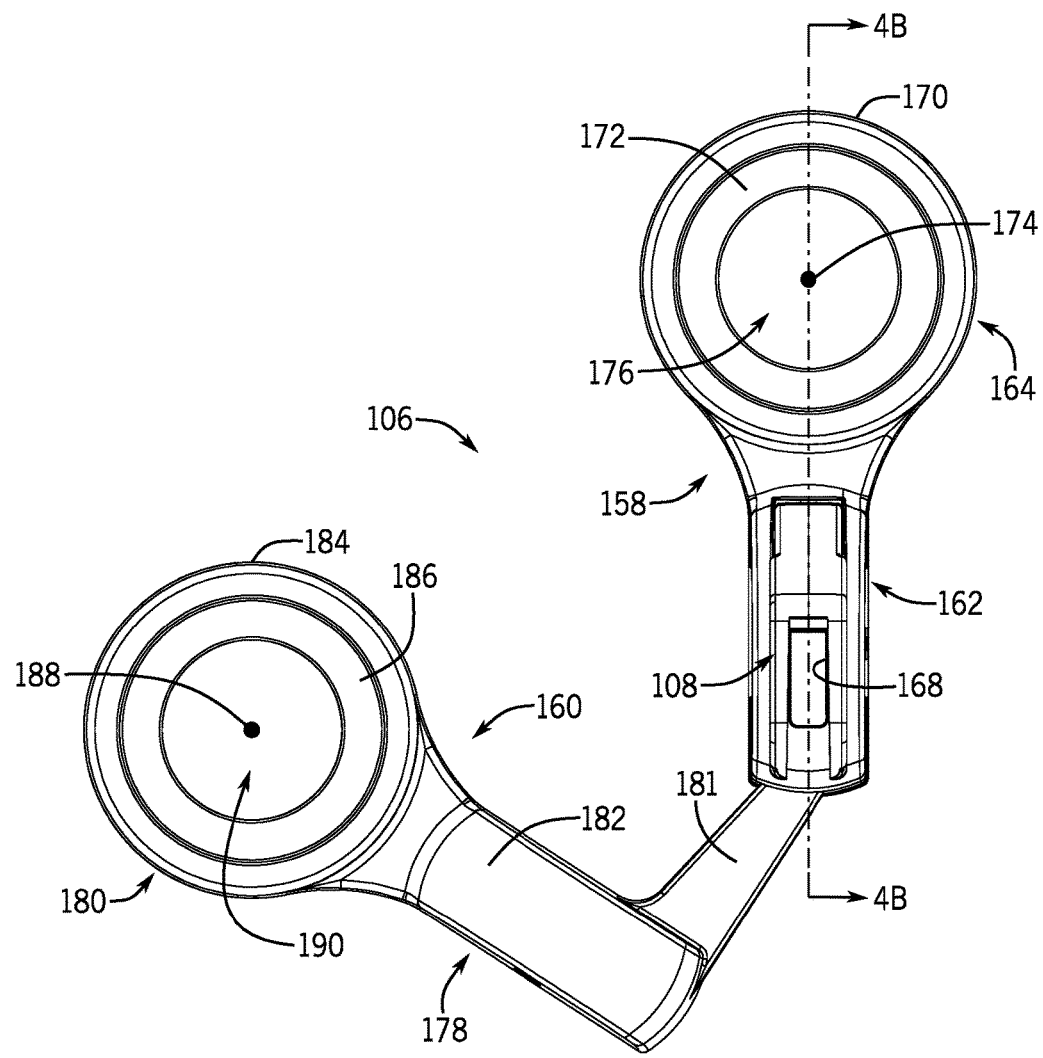
FIG. 4A is a rear elevational view of a sliding section and an engagement mechanism of the lockout device of FIG. 1.
Figure 4B:
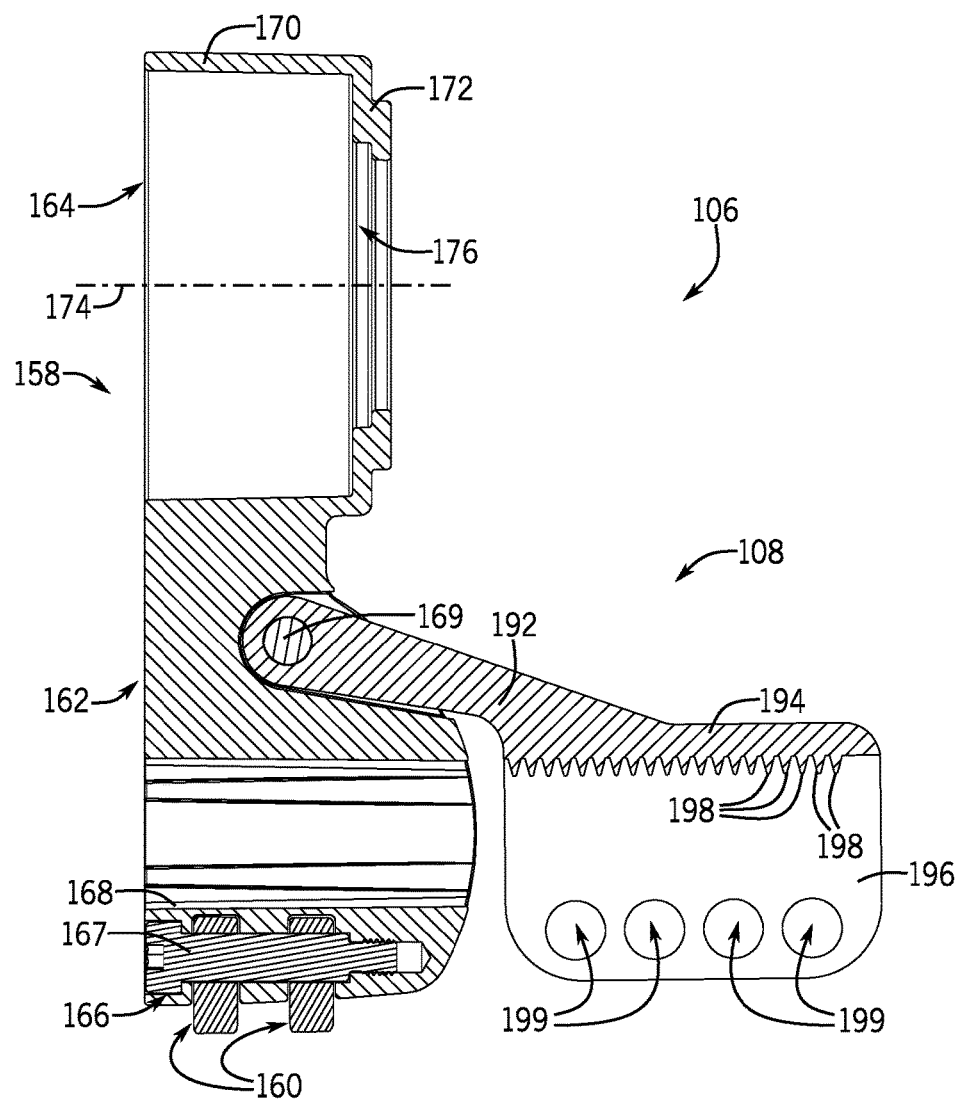
FIG. 4B is a cross-sectional view of a sliding cup segment and an engagement mechanism of the sliding section taken along line 4B-4B of FIG. 4A.

Turning now to FIGS. 4A and 4B, the sliding section 106 and the engagement mechanism 108 are illustrated. The sliding section 106 includes a sliding cup segment 158 and a sliding hinged cup segment 160.

The sliding cup segment 158 includes a sliding connection arm 162 and a sliding cup 164. The sliding connection arm 162 includes a cup hinge 166 (shown in FIG. 4B), a bar-engaging aperture 168, and an engagement mechanism hinge 169 (shown in FIG. 4B). The cup hinge 166 is disposed at a bottom end of the sliding connection arm 162 and includes a cup shoulder screw 167. The bar-engaging aperture 168 is disposed near the bottom end of the sliding connection arm 162, proximate the cup hinge 166, and is configured to slidably couple the sliding cup segment 158 to the sliding-section engagement portion 148 of the bar 104. The engagement mechanism hinge 169 is disposed approximately halfway between the bar-engaging aperture 168 and the sliding cup 164, and is configured to hingedly couple the engagement mechanism 108 to the sliding cup segment 158, as will be described below.

The sliding cup 164 is coupled to a top end of the sliding connection arm 162 and is axially aligned with and opposes the fixed cup 116, such that an open side of the sliding cup 164 faces an open side of the fixed cup 116. The sliding cup 164 includes a circumferential outer wall 170 and a sliding-cup rear wall 172. The circumferential outer wall 170 again defines a generally circular profile. The sliding-cup rear wall 172 is coupled to a rear edge of the circumferential outer wall 170 and extends radially inward toward a sliding-cup axis 174 that is generally aligned with the fixed-cup axis 128, terminating at a sliding-cup through-hole 176. The sliding-cup through-hole 176 is centered at the sliding-cup axis 174.

The sliding hinged cup segment 160 includes a sliding hinged connection arm 178 and a sliding hinged cup 180. The sliding hinged connection arm 178 includes a sliding extension portion 181 and a sliding connection portion 182. The sliding extension portion 181 is hingedly coupled to the cup hinge 166 of the sliding cup segment 158. The sliding extension portion 181 radially (relative to the hinge axis between the two) extends between the cup hinge 166 and the sliding connection portion 182. The sliding connection portion 182 non-radially extends between the sliding extension portion 181 and the sliding hinged cup 180.

The sliding hinged cup 180 opposes the hinged cup 134, such that an open side of the sliding hinged cup 180 faces an open side of the hinged cup 134. Additionally, the sliding hinged cup 180 includes a circumferential outer wall 184 and a sliding hinged cup rear wall 186. The circumferential outer wall 184 again defines a generally circular profile. The sliding hinged cup rear wall 186 similarly extends radially inward toward a sliding hinged cup axis 188, terminating at a sliding hinged cup through-hole 190. The sliding hinged cup through-hole 190 is centered at the sliding hinged cup axis 188.

As best illustrated in FIG. 4B, the engagement mechanism 108 is hingedly coupled to the engagement mechanism hinge 169 of the sliding cup segment 158 and includes an engagement mechanism connection arm 192, an upper wall 194, and a pair of opposed sidewalls 196 (only one of which is shown in the cross-sectional view of FIG. 4B) which straddle the bar 104. The engagement mechanism connection arm 192 extends between the engagement mechanism hinge 169 and the upper wall 194. The upper wall 194 extends between top edges of the pair of opposed sidewalls 196 and includes internal teeth 198, position and configured to selectively engage the teeth 157 of the bar 104, thereby preventing the sliding section 106 from sliding relative to the bar 104 when engaged, as will be described below, but permitting sliding translation when disengaged.

The pair of opposed sidewalls 196 extend from the upper wall 194, in a generally downward direction, and include a plurality of aligned lockout holes 199. The lockout holes 199 are configured to receive one or more locks such as padlocks, as will be described below.

As described above, in the illustrated embodiment, the engagement mechanism 108 comprises a latch with internal teeth 198 that is selectively rotatable into and out of engagement with the teeth 157 on the bar 104, thereby selectively preventing the sliding section 106 from sliding away from the fixed section 102. It will be understood that this is an exemplary engagement mechanism 108, and in other embodiments, it is contemplated that the engagement mechanism 108 could alternatively or additional comprise any of a variety of suitable engagement mechanisms. For example, in some instances, the engagement mechanism 108 could be a spring-loaded handle with internal teeth configured to selectively engage and disengage the teeth 157 of the bar 104 biased towards one of the engagement positions. In some other instances, the engagement mechanism 108 could be a spring-loaded handle that includes abrasive and/or frictional internal surfaces which are configured to selectively engage and disengage non-toothed surfaces of the bar 104 rather than having or in addition to teeth. In yet some other instances, the engagement mechanism 108 can be any other suitable engagement mechanism capable of preventing the sliding section 106 from sliding away from the fixed section 102.

It should be noted that, in some instances, the above-described lockout device 100 may be used in areas containing flammable or explosive gases. In these instances, some or all of the components discussed above can be made out of a non-sparking material, such as, for example, aluminum-bronze, or any other suitable non-sparking material.

Now that the various features of the lockout device 100 have been described above, the functionality and an exemplary method of use of the lockout device 100 will be described below. It will be appreciated that the following description is meant to be exemplary, and is in no way meant to be limiting. For example, although the lockout device 100 will be described with reference to a lockout procedure for a pipe flange connection 202, the lockout device 100 can be used in other settings without departing from the scope of the present application.

Figure 5A:
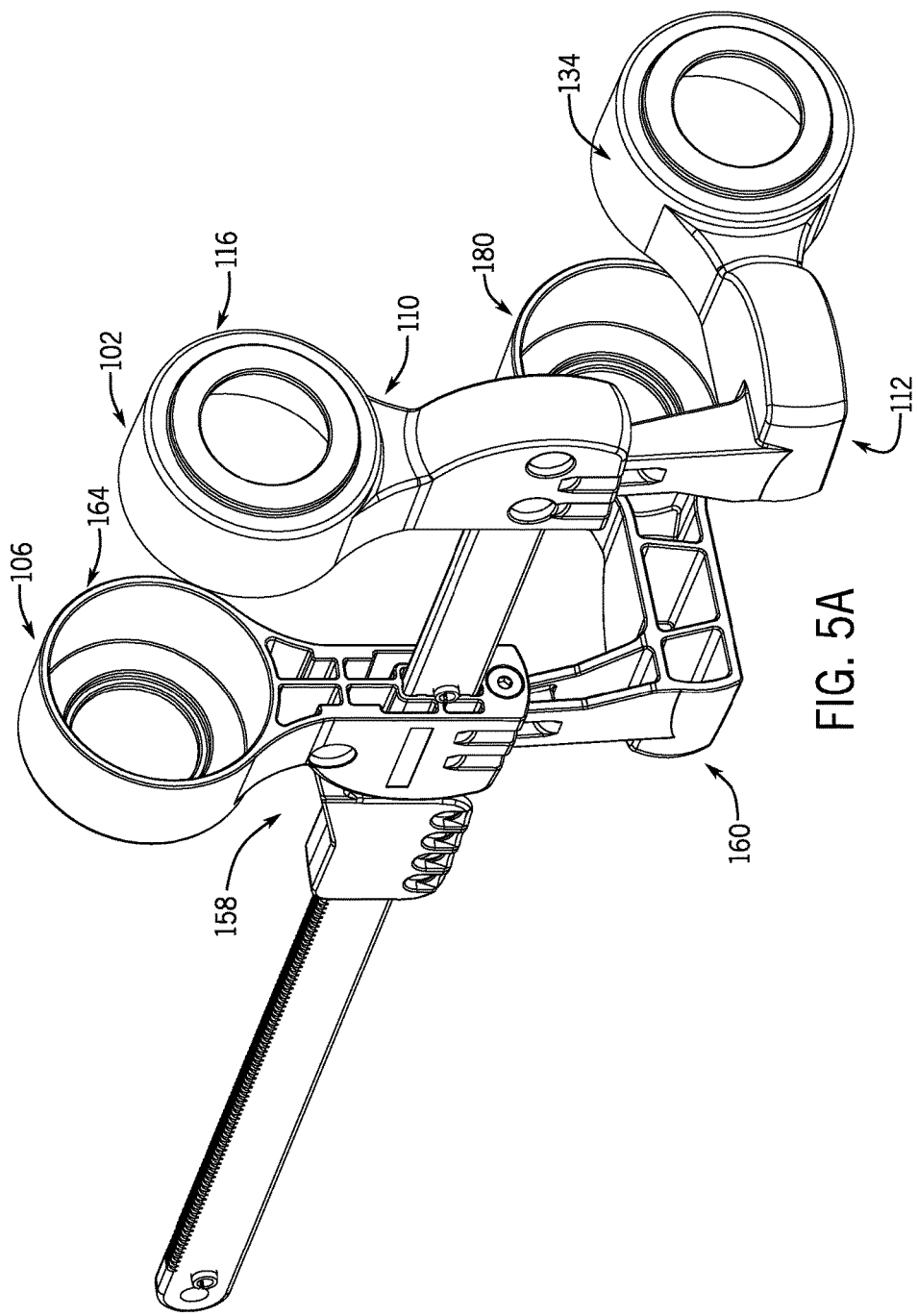
FIG. 5A and FIG. 5B are front, top, left perspective views of the lockout device of FIG. 1, shown in different hinged positions.
Figure 5B:
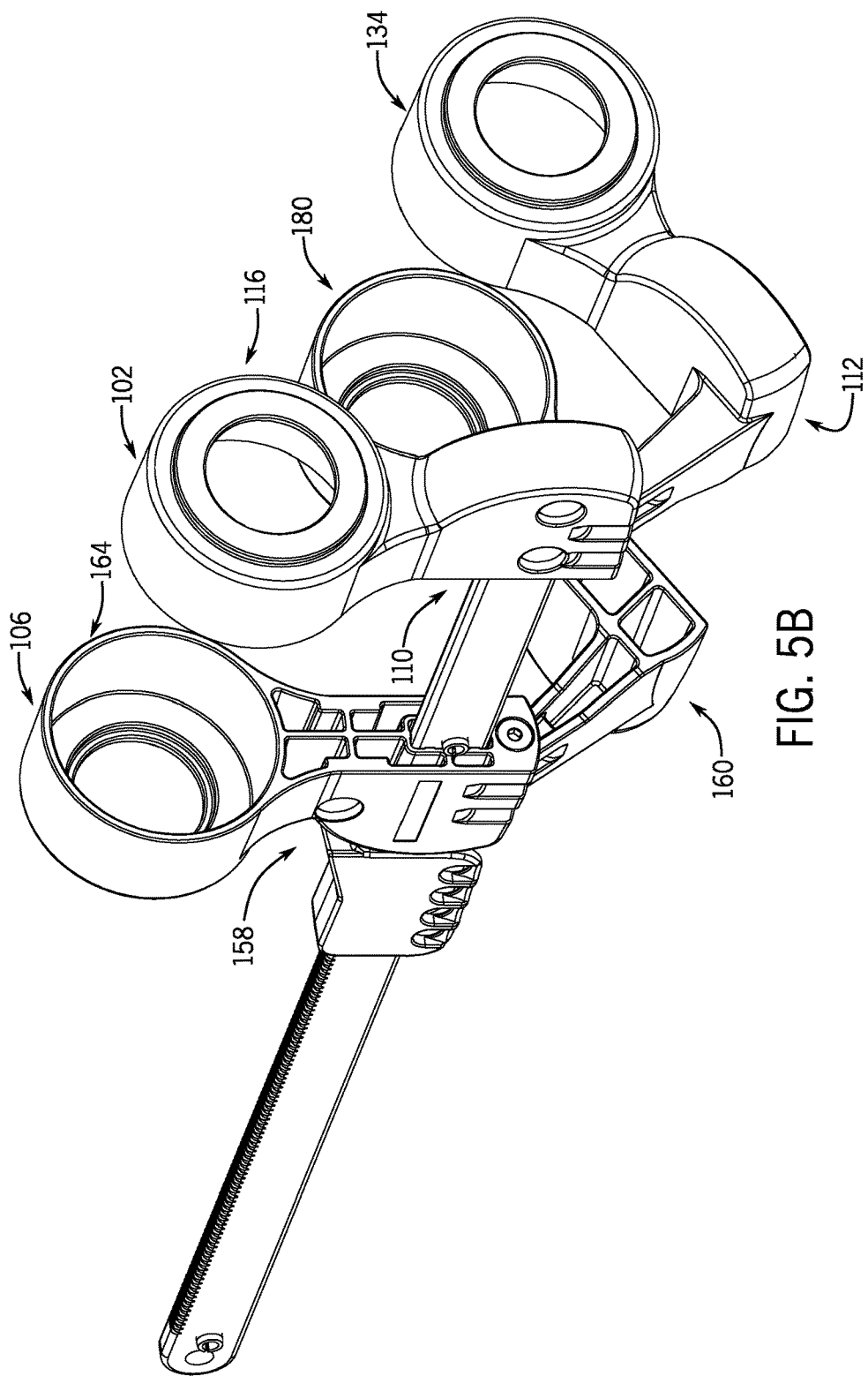

As illustrated in FIGS. 5A and 5B, the fixed section 102 and the sliding section 106 of the lockout device 100 are hingedly adjustable by rotating the hinged cup segment 112 and the sliding hinged cup segment 160 relative to the fixed cup segment 110 and the sliding cup segment 158, respectively. In some instances, the fixed section 102 and the sliding section 106 may be movable between a wide angle configuration, where the hinged cup 134 and the sliding hinged cup 180 are rotated away from the fixed cup 116 and the sliding cup 164, respectively (as shown in FIG. 5A), and a narrow angle configuration, where the hinged cup 134 and the sliding hinged cup 180 are rotated toward the fixed cup 116 and the sliding cup 164, respectively, (as shown in FIG. 5B), to accommodate the various particular fastener-to-fastener distance in different pipe flange connections, as described below.

It should be appreciated that the wide angle configuration and the narrow angle configuration illustrated in FIGS. 5A and 5B are meant to be exemplary. A person skilled in the art will understand that the hinged cup 134 and the sliding hinged cup 180 might be rotated further away from the fixed cup 116 and the sliding cup 164, respectively, than shown in FIG. 5A. Additionally, a person skilling in the art will understand that the hinged cup 134 and the sliding hinged cup 180 can be rotated closer toward the fixed cup 116 and the sliding cup 164, respectively than shown in FIG. 5B. In some instances, the hinged cup 134 and the sliding hinged cup 180 can be rotated into contact with the fixed cup 116 and the sliding cup 164, respectively, forming a fully closed configuration for receiving very closely-spaced fasters.

Figure 6A:
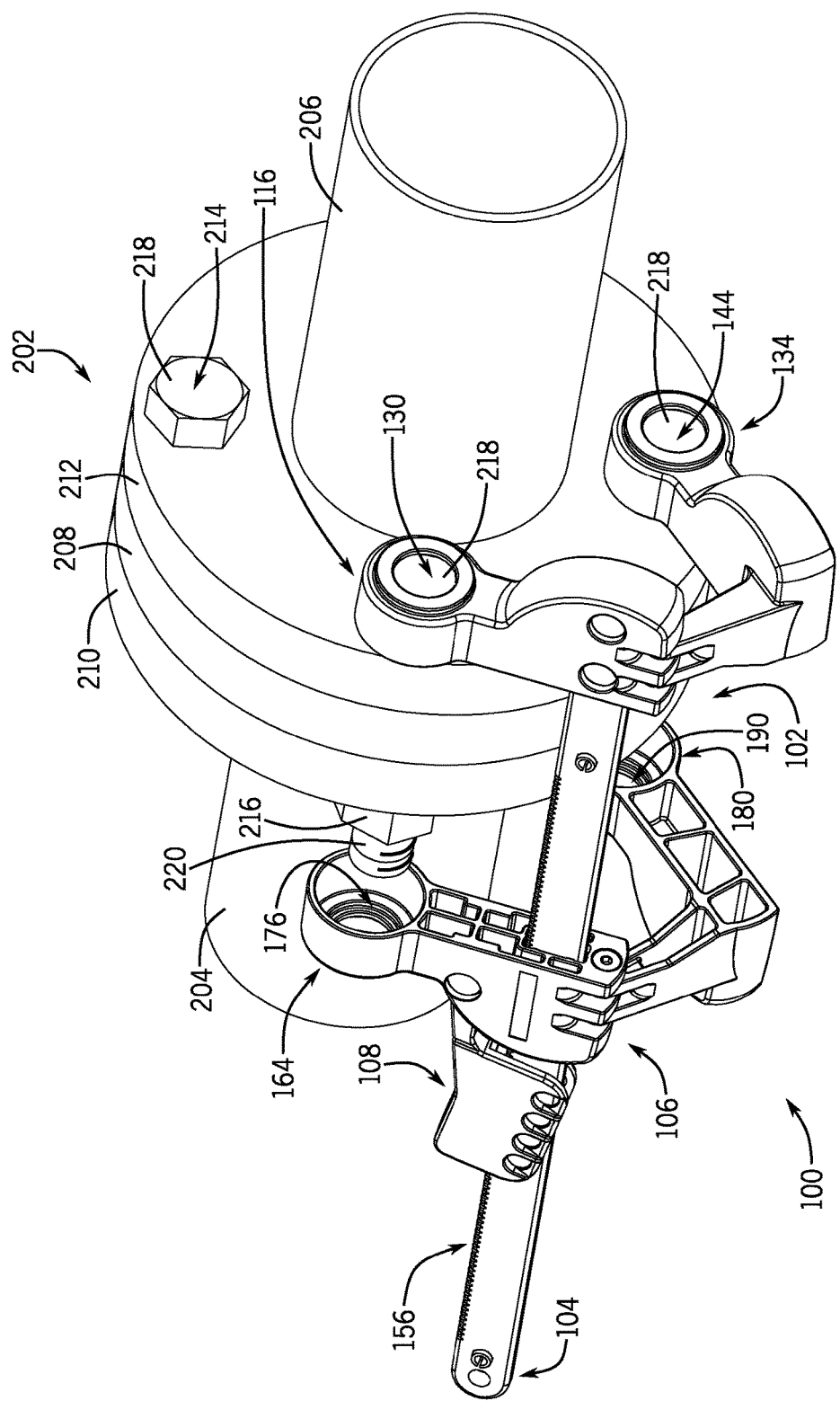
Figure 6B:
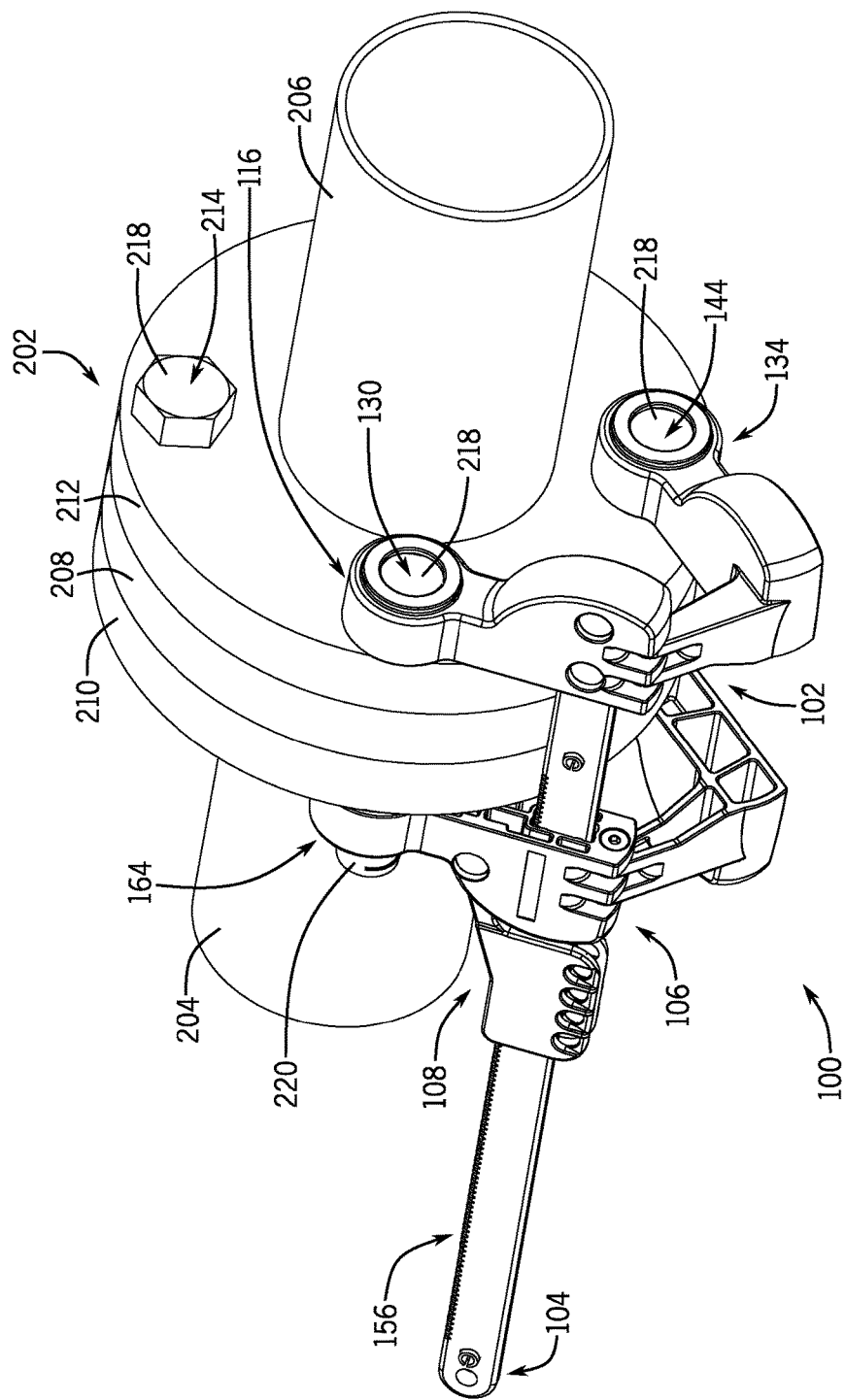

Turning now to FIGS. 6A-6C, the lockout device 100 (albeit one with slightly smaller-sized cups) is shown during various states of a lockout procedure of the pipe flange connection 202, typically performed during a maintenance procedure (or various other service procedures) done on a fluid system upstream or downstream of the pipe flange connection 202. The pipe flange connection 202 includes an inlet pipe 204, an outlet pipe 206, and a blind flange 208. The inlet pipe 204 includes an inlet flange 210 and the outlet pipe 206 includes an outlet flange 212. The blind flange 208 is disposed between the inlet flange 210 and the outlet flange 212. The inlet flange 210, the blind flange 208, and the outlet flange 212 are rigidly coupled together using a plurality of bolts 214 and corresponding nuts 216.

As illustrated in FIG. 6A, to install the lockout device 100 on the pipe flange connection 202, the engagement mechanism 108 is first be rotated upward out of engagement with the toothed edge 156 of the bar 104. Once the engagement mechanism 108 is disengaged from the bar 104, the sliding section 106 can be slid away from the fixed section 102 to provide sufficient space between the sliding section 106 and the fixed section 102, such that the pipe flange connection 202 can be straddled between the sliding section 106 and the fixed section 102.

The fixed section 102 can then be mounted or received onto the pipe flange connection 202 by first adjusting the fixed section 102, as described above, such that the fixed cup 116 and the hinged cup 134 fit over and partially cover two fastening ends, here bolt heads 218, of two of the plurality of bolts 214, thereby covering and preventing access to the corresponding bolt heads 218.

Referring now to FIG. 6B, once the fixed section 102 has been positioned onto the pipe flange connection 202, the sliding section 106 can be mounted onto the pipe flange connection 202 in similar fashion. That is, the sliding section 106 can be mounted onto the pipe flange connection 202 by first adjusting the sliding section 106, as described above, and sliding the sliding section 106 toward the fixed section 102, such that the sliding cup 164 and the sliding hinged cup 180 cover corresponding fastener ends, here nuts 216, of the two of the plurality of bolts 214 that have their corresponding bolt heads 218 covered by the fixed cup 116 and the hinged cup 134, thereby covering and preventing access to the corresponding nuts 216.

Note that when the sliding section 106 is slid toward the fixed section 102, threaded portions 220 of the corresponding bolts 214 are allowed to pass through the sliding-cup through-hole 176 and the sliding hinged cup through-hole 190, thereby allowing the sliding cup 164 and the sliding hinged cup 180 to be slid past the threaded portions 220 to cover the corresponding nuts 216. In some instances, where the ends of the fastener are axially reversed, the threaded portions might extend though the analogous openings on the fixed section 102.

Once the fixed section 102 and the sliding section 106 have been mounted onto the pipe flange connection 202, the engagement mechanism 108 can be rotated downward into engagement with the toothed edge 156, thereby preventing the sliding section 106 from sliding away from the fixed section 102, and rigidly fixing the lockout device 100 onto the pipe flange connection 202.

Referring now to FIG. 6C, once the lockout device 100 has been locked onto the pipe flange connection 202, at least one lock 222 can be attached to at least one of the lockout holes 199. With the at least one lock 222 attached to the at least one of the lockout holes 199, the engagement mechanism 108 is prevented from rotating out of engagement with the bar 104. As such, the lockout device 100 is locked onto the pipe flange connection 202, and cannot be removed from the pipe flange connection 202 without removing the at least one lock 222, thereby preventing the pipe flange connection 202 from being opened. It is noted that multiple lockout holes 199 exist because more than one individual may want to secure and lock out the connection simultaneously and this ensures that all users have their locks removed before unlocking the connection.

After the maintenance procedure is finished upstream or downstream of the pipe flange connection 202, the lockout device 100 can be removed from the pipe flange connection 202. To remove the lockout device 100, the at least one lock 222 (or in many cases multiple locks 222) can first be removed from the at least one of the lockout holes 199. The engagement mechanism 108 can then be rotated out of engagement with the bar 104. Finally, the sliding section 106 can be slid away from the fixed section 102, and the lockout device 100 can be removed from the pipe flange connection 202.

It should be appreciated that each of the cups 116, 134, 164, 180 include through-holes 130, 144, 176, 190, and as such, any of the various cups 116, 134, 164, 180 can be used to cover either a bolt head 218 or a corresponding nut 216. Therefore, the orientation of the nuts 216 and bolts 214 in the pipe flange connection 202 can be reversed, as also described below.

Additionally, it should also be appreciated that, in some instances, the fixed cup segment 110 and the sliding cup segment 158 can be mounted on the pipe flange connection 202, as described above, while the hinged cup segment 112 and the sliding hinged cup segment 160 are rotated away from the pipe flange connection 202, such that they are not mounted onto the pipe flanged connection 202.

In these instances, the hinged cup segment 112 and the sliding hinged cup segment 160 can optionally be removed from the locking device 100 by removing the shoulder screw 121 and the cup shoulder screw 167, as desired by a user.

Alternatively, in some instances, the hinged cup segment 112 and the sliding hinged cup segment 160 can be mounted on the pipe flange connection 202, as described above, while the fixed cup segment 110 and the sliding cup segment 158 are rotated away from the pipe flange connection 202.

In these instances, the hinged cup 134 and the sliding hinged cup 180 are farther from the bar 102 than the fixed cup 116 and the sliding cup 164. As such, the lockout device 100 can accommodate a deeper pipe flange connection (i.e., a pipe flange connection with more space between an outer circumferential edge and the corresponding bolts of the pipe flange connection).

Further, although the lockout device 100 is described above as being mounted onto the pipe flange connection 202, it will be understood by a person skilled in the art that the lockout device 100 can be mounted onto any bolted connection, as desired by a user.

Figure 7A:
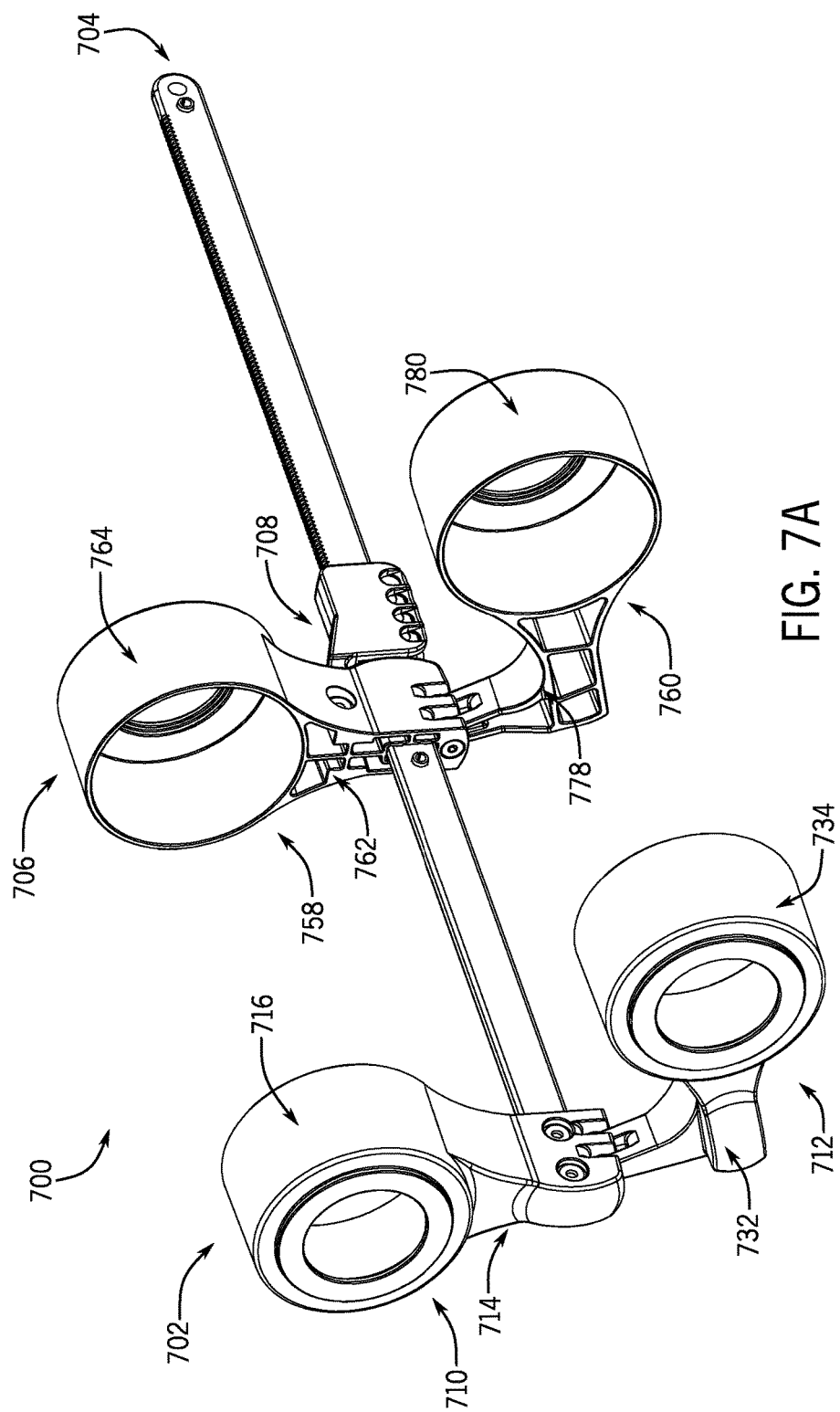
FIG. 7A is a front, top, right perspective view of another lockout device with large cups.

Referring now to FIG. 7, an alternative lockout device 700 is illustrated. The lockout device 700 is substantially similar to the lockout device 100. As such, corresponding components have been labeled similarly in the 700 series (e.g., fixed cup segment 110 and fixed cup segment 710, hinged cup 134 and hinged cup 734, etc.).

The lockout device 700 similarly includes a fixed section 702, a bar 704, a sliding section 706, and an engagement mechanism 708.

The fixed section 702 again includes a fixed cup segment 710 and a hinged cup segment 712, hingedly coupled to the fixed cup segment 710. The fixed cup segment 710 includes a fixed connection arm 714 and a fixed cup 716 coupled to a top end of the fixed connection arm 714. The hinged cup segment 712 includes a hinged connection arm 732 and a hinged cup 734 coupled to a top end of the hinged connection arm 732.

The sliding section 706 includes a sliding cup segment 758 and a sliding hinged cup segment 760. The sliding cup segment 758 includes a sliding connection arm 762 and a sliding cup 764 coupled to a top end of the sliding connection arm 762. The sliding hinged cup segment 760 includes a sliding hinged connection arm 778 and a sliding hinged cup 780 coupled to a top end of the sliding hinged connection arm 778.

As illustrated in FIGS. 1 and 7, the fixed cup 716, the hinged cup 734, the sliding cup 764, and the sliding hinged cup 780 are all substantially larger, relative to the rest of the lockout device 700, than the fixed cup 116, the hinged cup 134, the sliding cup 164, and the sliding hinged cup 180 are, relative to the lockout device 100. This accommodate fastener ends of different sizes in which the ends are larger.

Figure 7B:
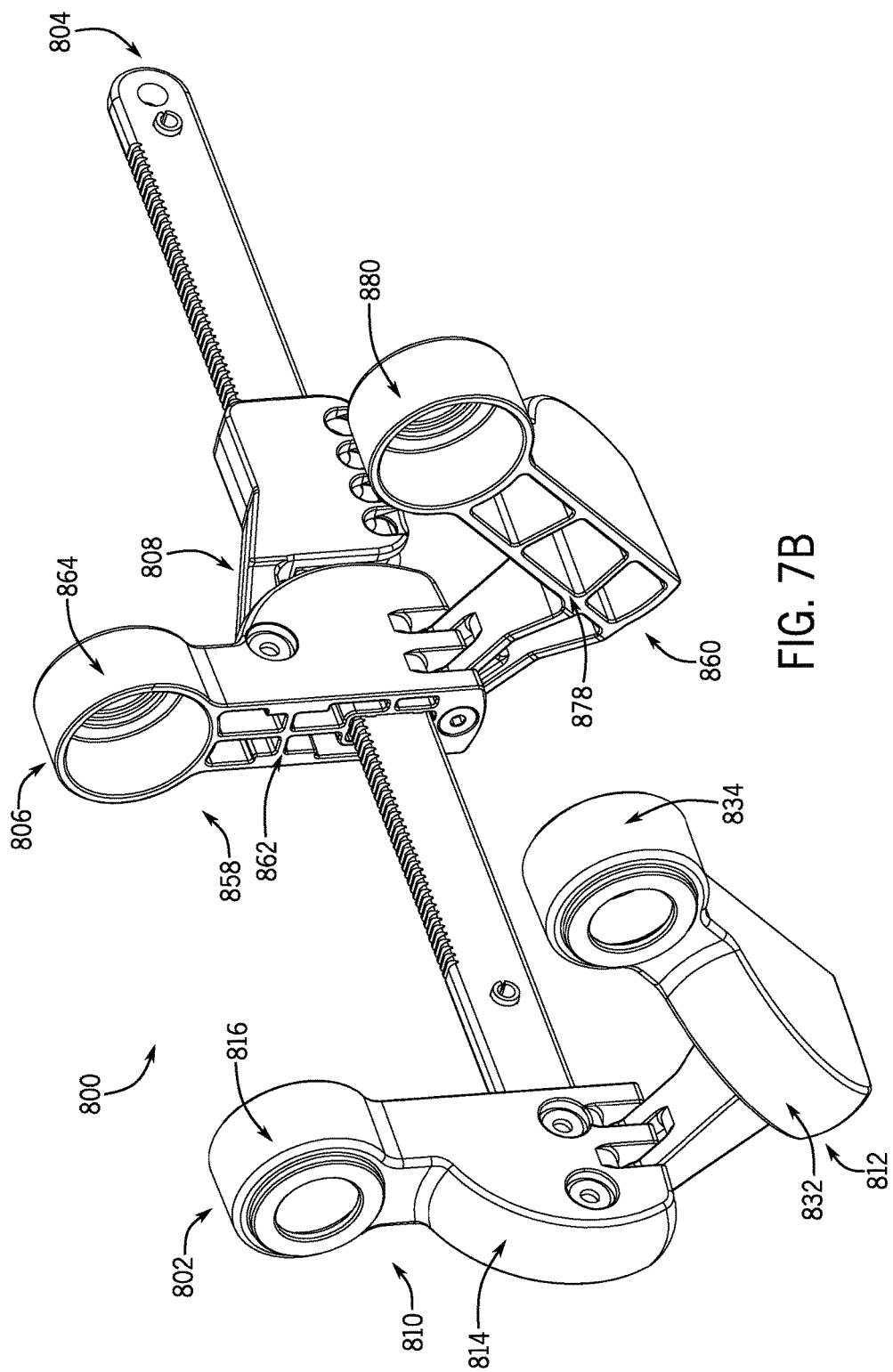
FIG. 7B is a front, top, right perspective view of another lockout device with small cups.

Referring now to FIG. 7B, a lockout device 800 is illustrated. The lockout device 800 is again substantially similar to the lockout device 100. As such, corresponding components have been labeled similarly in the 800 series (e.g., fixed cup segment 110 and fixed cup segment 810, hinged cup 134 and hinged cup 834, etc.).

The lockout device 800 again similarly includes a fixed section 802, a bar 804, a sliding section 806, and an engagement mechanism 808.

The fixed section 802 again includes a fixed cup segment 810 and a hinged cup segment 812, hingedly coupled to the fixed cup segment 810. The fixed cup segment 810 includes a fixed connection arm 814 and a fixed cup 816 coupled to a top end of the fixed connection arm 814. The hinged cup segment 812 includes a hinged connection arm 832 and a hinged cup 834 coupled to a top end of the hinged connection arm 832.

The sliding section 806 includes a sliding cup segment 858 and a sliding hinged cup segment 860. The sliding cup segment 858 includes a sliding connection arm 862 and a sliding cup 864 coupled to a top end of the sliding connection arm 862. The sliding hinged cup segment 860 includes a sliding hinged connection arm 878 and a sliding hinged cup 880 coupled to a top end of the sliding hinged connection arm 878.

Comparing FIGS. 1 and 7B, the fixed cup 816, the hinged cup 834, the sliding cup 864, and the sliding hinged cup 880 of FIG. 7B are all substantially smaller relative to the rest of the lockout device 800, than the fixed cup 116, the hinged cup 134, the sliding cup 164, and the sliding hinged cup 180 are, relative to the lockout device 100 in FIG. 1. These cups permit the reception of smaller fastener ends.

As noted above, it should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A lockout device configured to prevent access to a pipe flange connection, the lockout device comprising:
   a bar;
   a fixed section including a fixed cup segment rigidly coupled to the bar and a hinged cup segment hingedly coupled to the fixed cup segment;
   a sliding section including a sliding cup segment slidably coupled to the bar and a sliding hinged cup segment hingedly coupled to the sliding cup segment;
   an engagement mechanism coupled to the sliding section and configured to selectively engage the bar, thereby selectively preventing the sliding section from sliding relative to the bar; and
   wherein the fixed cup segment and the hinged cup segment respectively oppose the sliding cup segment and the sliding hinged cup segment.

2. The lockout device of claim 1, wherein the fixed section and the sliding section are configured to collectively cover at least one head of a bolt and at least one corresponding nut of the pipe flange connection, thereby preventing access to the at least one head of the bolt and the at least one corresponding nut of the pipe flange connection.

3. The lockout device of claim 2, wherein each of the fixed cup segment, the hinged cup segment, the sliding cup segment, and the sliding hinged cup segment includes a respective cup.

4. The lockout device of claim 3, wherein each cup of the fixed section is configured to cover a corresponding one of the at least one head of the bolt and the at least one corresponding nut, and each cup of the sliding section is configured to cover a corresponding different one of the at least one head of the bolt and the at least one corresponding nut.

5. The lockout device of claim 3, wherein each cup includes a through-hole configured to allow a threaded portion of the bolt to pass through the through-hole, while the corresponding nut is covered by the corresponding cup.

6. The lockout device of claim 1, wherein the engagement mechanism includes at least one lockout aperture configured to receive a lock, and when the lock is received within the at least one lockout aperture, the engagement mechanism is locked in engagement with the bar.

7. The lockout device of claim 1, wherein the engagement mechanism is a latch that is hingedly coupled to the sliding cup segment.

8. The lockout device of claim 7, wherein the bar includes teeth on an edge, the latch includes internal teeth configured to engage the teeth of the bar, and the latch is selectively rotatable to engage and disengage the internal teeth of the latch with the teeth of the bar.

9. The lockout device of claim 1, wherein each of the fixed cup segment and the sliding cup segment include a connection arm extending between the bar and a respective cup.

10. The lockout device of claim 1, wherein the hinged cup segment includes a hinged connection arm hingedly coupled to the fixed cup segment and including an hinged extension portion and a hinged connection portion, the hinged extension portion extending between the fixed cup segment and the hinged connection portion, and the hinged connection portion extending between the hinged extension portion and a hinged cup.

11. The lockout device of claim 10, wherein the sliding hinged cup segment includes a sliding connection arm hingedly coupled to the sliding cup segment and including a sliding extension portion and a sliding connection portion, the sliding extension portion extending between the sliding cup segment and the sliding connection portion, and the sliding connection portion extending between the sliding extension portion and a sliding hinged cup.

12. The lockout device of claim 1, wherein the bar includes at least one obstruction element configured to prevent the sliding cup segment from sliding past the at least one obstruction element of the bar.

13. The lockout device of claim 12, wherein the at least one obstruction element is a spring pin received in the bar.

14. A lockout device configured to prevent access to a pipe flange connection, the lockout device comprising:
    a bar;
    a pair of opposed cup sections each including a main cup segment coupled to the bar and a hinged cup segment hingedly coupled to the main cup segment;
    an engagement mechanism;
    wherein at least one of the main cup segments is slidably coupled to the bar and the engagement mechanism is configured to selectively prevent the at least one of the main cup segments that is slidably coupled to the bar from sliding relative to the bar.

15. The lockout device of claim 14, wherein the pair of opposed cup sections are configured to collectively cover at least one head of a bolt and at least one corresponding nut of the pipe flange connection, thereby preventing access to the at least one head of the bolt and the at least one corresponding nut of the pipe flange connection.

16. The lockout device of claim 15, wherein each of the main cup segments and the hinged cup segments of the pair of opposed cup sections includes a cup, and each cup of one of the pair of opposed cup sections is configured to cover a corresponding one of the at least one head of the bolt and the at least one corresponding nut, and each cup of the other of the pair of opposed cup sections is configured to cover a corresponding different one of the at least one head of the bolt and the at least one corresponding nut.

17. The lockout device of claim 15, wherein each cup includes a through-hole configured to allow a threaded portion of the bolt to pass through the through-hole, while the corresponding nut is covered by the corresponding cup.

18. The lockout device of claim 14, wherein the engagement mechanism includes at least one lockout aperture configured to receive a lock and, when the lock is received within the at least one lockout aperture, the engagement mechanism is locked in engagement with the bar.

19. The lockout device of claim 14, wherein the bar includes teeth on an edge, the engagement mechanism is a latch that includes internal teeth configured to engage the teeth of the bar and is hingedly coupled to the at least one of the main cup segments that is slidably coupled to the bar, and the latch is selectively rotatable to engage and disengage the internal teeth of the latch with the teeth of the bar.

20. The lockout device of claim 14, wherein the bar includes at least one obstruction element configured to prevent the at least one of the main cup segments that is slidably coupled to the bar from sliding past the at least one obstruction element of the bar.

21. A lockout device configured to prevent access to a pipe flange connection, the lockout device comprising:
    a bar including teeth on an edge;
    a pair of opposed cup sections coupled to the bar;
    a latch including internal teeth configured to engage the teeth of the bar and including at least one lockout aperture configured to receive a lock;

wherein at least one of the pair of opposed cup sections is slidably coupled to the bar and the latch is hingedly coupled to the at least one of the pair of opposed cup sections that is slidably coupled to the bar and is selectively rotatable to engage and disengage the internal teeth of the latch with the teeth of the bar; and wherein, when the latch is rotated to engage the bar and the lock is received within the at least one lockout aperture, the internal teeth of the latch are locked in engagement with the teeth of the bar and the at least one lockout aperture is on a side of the bar opposite a side of the bar on which an axis of hinged rotation of the latch is disposed.

22. The lockout device of claim 21, wherein the pair of opposed cup sections each include a main cup segment coupled to the bar and a hinged cup segment hingedly coupled to the main cup segment.

\* \* \* \* \*